United States Patent
Naito

(10) Patent No.: US 9,897,166 B2
(45) Date of Patent: Feb. 20, 2018

(54) TRANSMISSION AND WORKING VEHICLE

(71) Applicant: KOMATSU LTD., Tokyo (JP)

(72) Inventor: Shinichi Naito, Yuuki (JP)

(73) Assignee: KOMATSU LTD., Tokyo (JP)

( * ) Notice: Subject to any disclaimer, the term of this patent is extended or adjusted under 35 U.S.C. 154(b) by 36 days.

(21) Appl. No.: 14/903,330

(22) PCT Filed: Jul. 16, 2014

(86) PCT No.: PCT/JP2014/068920
§ 371 (c)(1),
(2) Date: Jan. 7, 2016

(87) PCT Pub. No.: WO2015/072179
PCT Pub. Date: May 21, 2015

(65) Prior Publication Data
US 2016/0146310 A1 May 26, 2016

(30) Foreign Application Priority Data
Nov. 18, 2013 (JP) .................... 2013-238212

(51) Int. Cl.
*F16H 3/66* (2006.01)
*F16D 25/10* (2006.01)
(Continued)

(52) U.S. Cl.
CPC ............... *F16H 3/66* (2013.01); *F16D 25/10* (2013.01); *F16H 3/725* (2013.01);
(Continued)

(58) Field of Classification Search
CPC .. F16D 25/082; F16D 25/083; F16D 25/0638; F16D 25/10; B60K 17/02; F16H 3/66
See application file for complete search history.

(56) References Cited

U.S. PATENT DOCUMENTS 3,279,573 A * 10/1966 Hensel .................... F16D 25/10
                                                           192/48.61
3,858,698 A     1/1975 Hause
(Continued)

FOREIGN PATENT DOCUMENTS

CN       102959276 A    3/2013
CN       103080602 A    5/2013
(Continued)

OTHER PUBLICATIONS

International Search Report for the corresponding international application No. PCT/JP2014/068920, dated Oct. 21, 2014.
(Continued)

*Primary Examiner* — Ramya P Burgess
*Assistant Examiner* — David R Morris
(74) *Attorney, Agent, or Firm* — Global IP Counselors, LLP

(57) ABSTRACT

A first clutch is configured to switch between connection and disconnection of a second carrier and a housing. The first clutch is arranged between a first planetary gear mechanism and a second planetary gear mechanism in the axial direction. A second clutch is arranged between the second planetary gear mechanism and the first planetary gear mechanism in the axial direction. The second clutch has an outer diameter which is smaller than an outer diameter of the first clutch. A first piston is configured so that, by applying pressure to the first clutch, the first clutch is connected. A return spring lines up with the first clutch in the axial direction and is arranged on the outside of the second clutch in the radial direction. The return spring presses the first piston to separate from the first clutch.

16 Claims, 5 Drawing Sheets

(51) Int. Cl.
*F16H 3/72* (2006.01)
*F16H 61/00* (2006.01)
*F16H 61/02* (2006.01)
*F16H 63/30* (2006.01)
*B60K 17/02* (2006.01)

(52) U.S. Cl.
CPC ..... *F16H 61/0025* (2013.01); *F16H 61/0265* (2013.01); *F16H 63/3026* (2013.01); *B60K 17/02* (2013.01); *F16H 2200/2007* (2013.01); *F16H 2200/2035* (2013.01)

(56) References Cited

U.S. PATENT DOCUMENTS

| | | | | | |
|---|---|---|---|---|---|
| 4,970,945 | A | * | 11/1990 | Schmidt | F16D 25/0638 192/85.41 |
| 5,416,966 | A | * | 5/1995 | Boerger, Jr. | F16D 25/10 192/48.614 |
| 5,478,290 | A | * | 12/1995 | Buuck | F16D 25/082 192/48.611 |
| 5,647,467 | A | * | 7/1997 | Yamauchi | F16D 25/0638 192/106 F |
| 5,653,321 | A | * | 8/1997 | Takaoka | F16D 13/648 188/71.5 |
| 6,227,340 | B1 | * | 5/2001 | Braford, Jr. | F16D 25/0638 192/48.1 |
| 6,609,439 | B1 | * | 8/2003 | Yamaguchi | F16D 25/0638 74/606 R |
| 7,128,688 | B2 | * | 10/2006 | Katou | F16D 25/10 137/112 |
| 7,896,145 | B2 | * | 3/2011 | Kato | F16D 25/0638 192/48.619 |
| 8,544,628 | B2 | * | 10/2013 | Janson | F16D 25/10 138/43 |
| 9,011,287 | B2 | * | 4/2015 | Meyer | F16H 3/44 192/48.611 |
| 2001/0012808 | A1 | | 8/2001 | Tajima et al. | |
| 2009/0105028 | A1 | | 4/2009 | Hiraki et al. | |
| 2013/0174682 | A1 | | 7/2013 | Sasada et al. | |
| 2013/0239719 | A1 | | 9/2013 | Sasada et al. | |

FOREIGN PATENT DOCUMENTS

| | | |
|---|---|---|
| JP | 60-84442 A | 5/1985 |
| JP | 62-200844 U | 12/1987 |
| JP | 64-15558 A | 1/1989 |
| JP | 6-17842 A | 1/1994 |
| JP | 2006-329244 A | 12/2006 |
| JP | 2007-50860 A | 3/2007 |
| JP | 2009-103244 A | 10/2007 |

OTHER PUBLICATIONS

The extended European search report for the corresponding European application No. 14862435.6 dated Jun. 27, 2017.
The Office Action for the corresponding Chinese application No. 201480041155.8, dated Mar. 24, 2017.

* cited by examiner

| MODE | Lo | | Hi | |
|---|---|---|---|---|
| | L1 | L2 | H1 | H2 |
| MOTOR / GENERATOR MG1 | M | M | G | G |
| MOTOR / GENERATOR MG2 | G | G | M | M |
| MOTOR / GENERATOR MG3 | M | G | M | G |
| CLUTCH CL | O | O | X | X |
| CLUTCH CH | X | X | O | O |
| CLUTCH Cm1 | O | X | X | O |
| CLUTCH Cm2 | X | O | O | X |

TRANSMISSION AND WORKING VEHICLE

CROSS-REFERENCE TO RELATED APPLICATIONS

This application is a U.S. National stage application of International Application No. PCT/JP2014/068920, filed on Jul. 16, 2014. This U.S. National stage application claims priority under 35 U.S.C. § 119(a) to Japanese Patent Application No. 2013-238212, filed in Japan on Nov. 18, 2013, the entire contents of which are hereby incorporated herein by reference.

BACKGROUND

The present invention relates to a transmission and a working vehicle.

A plurality of planetary gear mechanisms and a plurality of clutches, which are for switching between connection and disconnection of rotation elements in the planetary gear mechanisms, are provided in a transmission. For example, a transmission which is provided with a first planetary gear mechanism and a second planetary gear mechanism is disclosed in Japanese Unexamined Patent Application Publication No. 2006-329244. In this transmission, connection and disconnection of a carrier of the second planetary gear mechanism and a housing is switched using a low speed clutch. In addition, connection and disconnection of a carrier of the second planetary gear mechanism and a ring gear in the first planetary gear mechanism is switched using a high speed clutch.

At the same time, a return spring for returning the clutch to a state of disconnection is typically provided in the clutch. The return spring presses a piston in the clutch in a direction which returns the clutch to a state of disconnection. For example, the piston applies pressure to a clutch plate against the pressing force of the return spring due to hydraulic fluid being supplied to a hydraulic fluid chamber of the piston when the clutch is connected. The hydraulic fluid is discharged from the hydraulic fluid chamber of the piston by the piston being returned due to the pressing force of the return spring when the clutch is disconnected.

SUMMARY

The number of clutch plates increases or the outer diameter of the clutch plates becomes larger due to an increase in the load which is received by the clutch for switching between connection and disconnection of the carrier of the second planetary gear mechanism and the housing as described above. For this reason, the piston for driving the clutch becomes larger. When the piston becomes larger, it is easy for there to be delays in the hydraulic fluid being discharged from the hydraulic fluid chamber when the clutch is disconnected. Delays in the hydraulic fluid being discharged in this manner are a cause of there being delays in the clutch being disconnected. Accordingly, it is preferable that the force of the return spring for returning the clutch to a state of disconnection be large.

At the same time, the plurality of clutches are for switching between connection and disconnection of rotation elements in the first planetary gear mechanism and the second planetary gear mechanism and it is preferable that the plurality of clutches are arranged in a compact manner in the space between the first planetary gear mechanism and the second planetary gear mechanism.

However, in this case, the space between the first planetary gear mechanism and the second planetary gear mechanism is limited due to the positioning of the first planetary gear mechanism or the second planetary gear mechanism. For this reason, it is not easy to arrange the return spring in the space between the first planetary gear mechanism and the second planetary gear mechanism. When the return spring is, for example, arranged between the plurality of clutches in the axial direction of the first planetary gear mechanism and the second planetary gear mechanism, the distance between the first planetary gear mechanism and the second planetary gear mechanism in the axial direction becomes larger. For this reason, there is a problem in that there is an increase in size of the transmission. In addition, when the return spring is arranged on the outside of the clutch in the radial direction, there is a problem in that there is an increase in size of the transmission in the radial direction. In particular, there is a further increase in size in the transmission when the return spring which is used is large in order to increase the force of the return spring.

In addition, it is preferable that one out of the plurality of clutches described above is arranged to be close to the housing to switch between connection and disconnection of the carrier of the second planetary gear mechanism and the housing. However, there is a problem in that the structure for connecting the housing and the clutch becomes complicated since the return spring is arranged on the outside of the clutch in the radial direction.

The exemplary embodiments of the present invention suppress delays in a clutch being disconnected, increases in the size of a transmission, and the structure becoming complicated.

A transmission according to one aspect is provided with a first planetary gear mechanism, a second planetary gear mechanism, a housing, a first clutch, a second clutch, a first piston, and a return spring. The first planetary gear mechanism has a first sun gear. The second planetary gear mechanism has a second sun gear, a plurality of second planetary gears which engage with the second sun gear, and a second carrier which supports the plurality of second planetary gears. The second planetary gear mechanism is arranged to be separated from the first planetary gear mechanism in the axial direction of the first planetary gear mechanism. The housing accommodates the first planetary gear mechanism and the second planetary gear mechanism. The first clutch is configured to switch between connection and disconnection of the second carrier and the housing. The first clutch is arranged between the first planetary gear mechanism and the second planetary gear mechanism in the axial direction. The second clutch is arranged between the first planetary gear mechanism and the second planetary gear mechanism in the axial direction. The second clutch has an outer diameter which is smaller than the outer diameter of the first clutch. The first piston is configured so that, by applying pressure to the first clutch, the first clutch is connected. The return spring lines up with the first clutch in the axial direction and is arranged on the outside of the second clutch in the radial direction. The return spring presses the first piston to separate from the first clutch.

In this case, the return spring is arranged in a space which lines up with the first clutch in the axial direction and is positioned on the outside of the second clutch in the radial direction by utilizing the difference in the outer diameters of the first clutch and the second clutch. For this reason, even when the return spring with a large force is used, it is possible to suppress increases in the size of the transmission compared to a case where the return spring is arranged on the outside of the first clutch in the radial direction or a case where the return spring is arranged to line up with the first clutch and the second clutch in the axial direction.

In addition, it is possible to secure a space for arranging the return spring even when the first clutch and the second clutch are arranged in a compact manner between the first planetary gear mechanism and the second planetary gear mechanism. For this reason, it is possible to suppress increases in the size of the transmission. Furthermore, it is possible to suppress the structure for connecting the first clutch and the housing from becoming complicated.

It is preferable that the first piston lines up with the first clutch in the axial direction and be arranged on the outside of the second clutch in the radial direction. In this case, the first piston is arranged in a space which lines up with the first clutch in the axial direction and is positioned on the outside of the second clutch in the radial direction by utilizing the difference in the outer diameters of the first clutch and the second clutch. Due to this, it is possible to further suppress increases in the size of the transmission.

It is preferable that a portion of the first piston be arranged on the outside of the first planetary gear mechanism in the radial direction. In this case, a portion of the first piston is arranged by utilizing the space which is positioned on the outside of the first planetary gear mechanism in the radial direction. Due to this, it is possible to further suppress increases in the size of the transmission.

It is preferable that the return spring be a coil spring. Due to this, it is possible to secure the return spring with a large force.

It is preferable that the transmission be further provided with a second piston. The second piston is configured so that, by applying pressure to the second clutch, the second clutch is connected. The second piston is arranged on the inside of the first clutch in the radial direction. In this case, the second piston is arranged by utilizing the space on the inside of the first clutch, which has a large outer diameter, in the radial direction. Due to this, it is possible to further suppress increases in the size of the transmission.

It is preferable that the transmission be further provided with a spring member which presses so that the second clutch is disconnected. The second clutch has a plurality of clutch plates. The spring member is a wave spring which is arranged between the plurality of clutch plates. In this case, it is possible for the spring member to be arranged in a small space. Due to this, it is possible to further suppress increases in the size of the transmission. In addition, it is difficult for the problem of there being a delay in the second clutch being disconnected to occur even when the force of the spring member is small compared to the force of the return spring since the second clutch is small compared to the first clutch.

It is preferable that the transmission be further provided with a return spring support section which is fixed to the housing. The first piston has a first flange section, a second flange section, and a linking section. The second flange section is arranged to be separated from the first flange section in the axial direction. The linking section links the first flange section and the second flange section. The return spring support section is positioned between the first flange section and the second flange section. The first flange section is positioned between the first clutch and the return spring support section. The return spring is arranged between the return spring support section and the second flange section.

In this case, the return spring support section is positioned between the first flange section and the second flange section in the first piston. For this reason, it is possible to suppress increases in the size of the transmission compared to a case where the first clutch, the first piston, and the return spring support section are arranged to line up in order in the axial direction.

It is preferable that the transmission be further provided with a first clutch support section, a first clutch pressing section, and a fixing member. The first clutch support section is arranged on the outside of the first clutch in the radial direction. The first clutch support section supports the first clutch. The first clutch pressing section is arranged to line up with the first clutch in the axial direction. The fixing member fixes the return spring support section, the first clutch support section, and the first clutch pressing section to the housing to overlap in the axial direction.

In this case, the return spring support section, the first clutch support section, and the first clutch pressing section are fixed to the housing using the fixing member in a state of overlapping with each other in the axial direction. For this reason, assembly is easy.

It is preferable that the first piston have a first component, a second component which is a separate body to the first component, and a fastening member. The first component includes the first flange section. The second component includes the second flange section. The fastening member fixes the second component to the first component. In this case, it is possible to fix the second component to the first component in a state where the return spring support section and the return spring are positioned between the first flange section and the second flange section. Due to this, assembly is easy.

It is preferable that the first planetary gear mechanism have a first sun gear, a plurality of first planetary gears, and a first ring gear. The plurality of first planetary gears engage with the first sun gear. The first ring gear engages with the plurality of planetary gears and is provided to be able to rotate. The second clutch switches between connection and disconnection of the second carrier and the first ring gear. In this case, the second clutch is not connected with the housing. For this reason, it is possible to suppress the structure of the transmission from becoming complicated even when the return spring is arranged on the outside of the second clutch in the radial direction.

It is preferable that the second clutch be arranged between the first clutch and the first planetary gear mechanism in the axial direction. In this case, the second clutch is arranged to be closer to the first planetary gear mechanism than the first clutch.

A working vehicle according to another aspect is provided with an engine, a hydraulic pump, a working implement, a travel apparatus, and the transmission described above. The hydraulic pump is driven using the engine. The working implement is driven using hydraulic fluid which is discharged from the hydraulic pump. The travel apparatus is driven using drive force from the engine. The transmission transfers drive force from the engine to the travel apparatus.

According to exemplary embodiments of the present invention, it is possible to suppress delays in a clutch being disconnected, increases in the size of a transmission, and the structure becoming complicated.

DETAILED DESCRIPTION OF EXEMPLARY EMBODIMENTS

Figure 1:
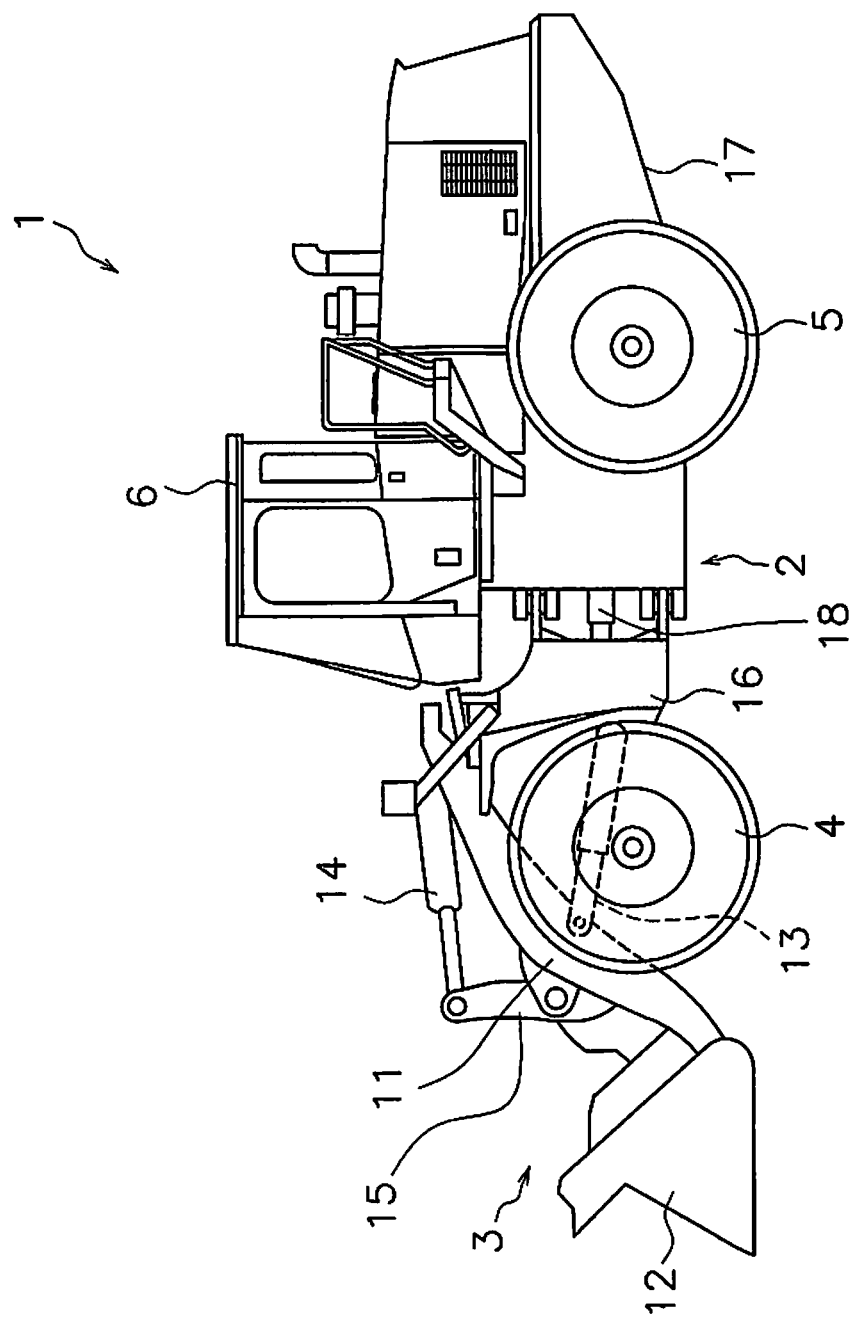
FIG. 1 is a side surface diagram of a wheel loader according to an exemplary embodiment of the present invention.

An exemplary embodiment of the present invention will be described below with reference to the diagrams. FIG. 1 is a side surface diagram of a working vehicle 1 according to an exemplary embodiment of the present invention. In the present exemplary embodiment, the working vehicle 1 is a wheel loader. The working vehicle 1 is provided with a vehicle frame 2, a working implement 3, travel wheels 4 and 5, and a driving cab 6 as shown in FIG. 1. The working vehicle 1 travels due to the travel wheels 4 and 5 being driven to rotate. It is possible for the working vehicle 1 to perform work, such as digging, using the working implement 3.

The working implement 3 and the travel wheel 4 are attached to the vehicle frame 2. The working implement 3 is driven using hydraulic fluid from a working implement pump 23 (refer to FIG. 2). The working implement 3 has a boom 11 and a bucket 12. The boom 11 is mounted on the vehicle frame 2. The working implement 3 has a lift cylinder 13 and a bucket cylinder 14. The lift cylinder 13 and the bucket cylinder 14 are hydraulic cylinders. One end of the lift cylinder 13 is attached to the vehicle frame 2. The other end of the lift cylinder 13 is attached to the boom 11. The boom 11 swings up and down by the lift cylinder 13 expanding and contracting due to hydraulic fluid from the working implement pump 23. The bucket 12 is attached to the tip end of the boom 11. One end of the bucket cylinder 14 is attached to the vehicle frame 2. The other end of the bucket cylinder 14 is attached to the bucket 12 via a bell crank 15. The bucket 12 swings up and down by the bucket cylinder 14 expanding and contracting due to hydraulic fluid from the working implement pump 23.

The driving cab 6 and the travel wheel 5 are attached to the vehicle frame 2. The driving cab 6 is placed on the vehicle frame 2. A seat where an operator sits, an operating apparatus which will be described later, and the like are arranged inside the driving cab 6. The vehicle frame 2 has a front frame 16 and a rear frame 17. The front frame 16 and the rear frame 17 are attached to each other to be able to swing in the left and right direction.

The working implement 3 is attached to the front frame 16. The driving cab 6 is placed on the rear frame 17. In addition, apparatuses, such as an engine 21 and a transmission 24 which will be described later and the like, are mounted on the rear frame 17. The transmission 24 is positioned in front of the engine 21.

The working vehicle 1 has a steering cylinder 18. The steering cylinder 18 is attached to the front frame 16 and the rear frame 17. The steering cylinder 18 is a hydraulic cylinder. The travelling direction of the working vehicle 1 changes to the left and right by the steering cylinder 18 expanding and contracting due to hydraulic fluid from a steering pump 30 which will be described later.

Figure 2:
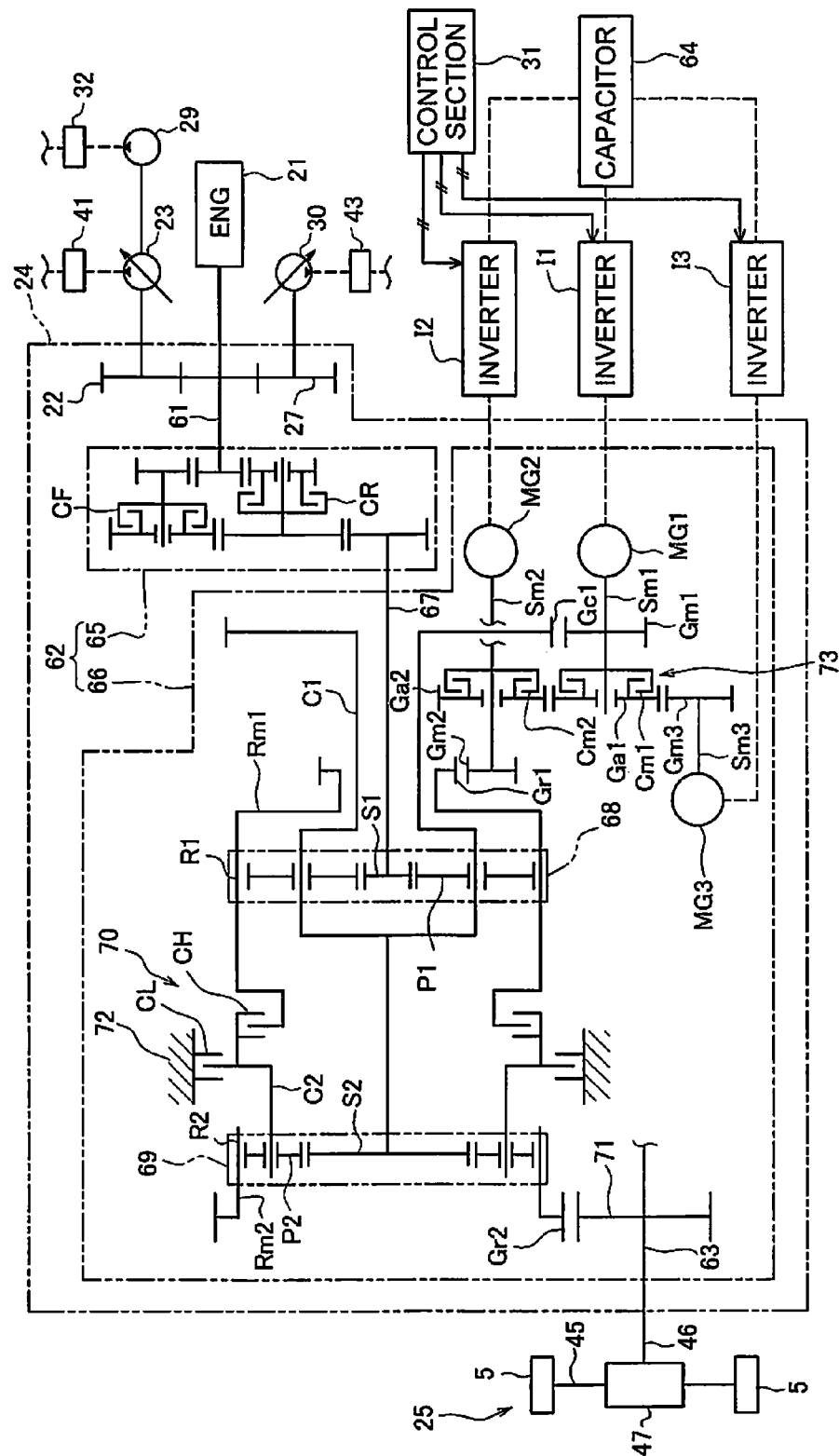
FIG. 2 is a schematic diagram illustrating the configuration of a wheel loader.

FIG. 2 is a schematic diagram illustrating the configuration of the working vehicle 1. The working vehicle 1 is provided with the engine 21, the working implement pump 23, a transmission pump 29, the steering pump 30, the transmission 24, a travel apparatus 25, and the like as shown in FIG. 2.

The engine 21 is, for example, a diesel engine. The engine 21 generates drive force for driving the travel apparatus 25, the working implement pump 23, the transmission pump 29, the steering pump 30, and the like.

The working implement pump 23, the transmission pump 29, and the steering pump 30 are hydraulic pumps. The working implement pump 23, the transmission pump 29, and the steering pump 30 are driven using drive force from the engine 21.

The working implement pump 23 is a variable capacity type of hydraulic pump. Hydraulic fluid which is discharged from the working implement pump 23 is supplied to the lift cylinder 13 and the bucket cylinder 14 described above via a working implement control valve 41.

The transmission pump 29 is a fixed capacity type of hydraulic pump. Hydraulic fluid which is discharged from the transmission pump 29 is supplied to various types of clutches in the transmission 24 which will be described later via a clutch control valve 32.

The steering pump 30 is a variable capacity type of hydraulic pump. Hydraulic fluid which is discharged from the steering pump 30 is supplied to the steering cylinder 18 described above via a steering control valve 43.

The transmission 24 transfers drive force from the engine 21 to the travel apparatus 25. The transmission 24 applies gearing and outputs drive force from the engine 21. The configuration of the transmission 24 will be described later in detail.

The travel apparatus 25 is driven using the engine 21. The travel apparatus 25 has a transfer shaft 46, an axle shaft 45, and the travel wheel 5 described above. The transfer shaft 46 transfers drive force from the transmission 24 to the axle shaft 45. The axle shaft 45 extends in a vehicle width direction and is connected with the travel wheel 5. The axle shaft 45 transfers drive force from the transmission 24 to the travel wheel 5. Due to this, the travel wheel 5 is rotated.

The configuration of the transmission 24 will be described next in detail. The transmission 24 is provided with an input shaft 61, a first power takeoff mechanism 22 (referred to below as a "first PTO 22"), a second power takeoff mechanism 27 (referred to below as a "second PTO 22"), a gear mechanism 62, an output shaft 63, a first motor MG1, a second motor MG2, and a third motor MG3.

Rotation from the engine 21 is input to the input shaft 61. The gear mechanism 62 transfers rotation from the input shaft 61 to the output shaft 63. The output shaft 63 is connected with the travel apparatus 25 described above and transfers rotation from the gear mechanism 62 to the travel apparatus 25.

The first PTO 22 is connected with the input shaft 61 and transfers a portion of drive force from the engine 21 to the working implement pump 23 and the transmission pump 29. The second PTO 27 is connected with the input shaft 61 in parallel with the first PTO 22 and transfers a portion of drive force from the engine 21 to the steering pump 30.

The gear mechanism 62 is a mechanism which transfers drive force from the engine 21. The gear mechanism 62 is configured so that the rotation speed ratio of the output shaft 63 with regard to the input shaft 61 changes according to changes in the rotation speed of the motors MG1, MG2, and MG3. The gear mechanism 62 has a FR switching mechanism 65 and a gearing mechanism 66.

The FR switching mechanism 65 has a forward clutch CF, a reverse clutch CR, and various types of gears. The forward clutch CF and the reverse clutch CR are hydraulic clutches. The direction of rotation which is output from the FR switching mechanism 65 is switched due to switching between connection and disconnection of the forward clutch CF and connection and disconnection of the reverse clutch CR.

The gearing mechanism 66 has an intermediate shaft 67, a first planetary gear mechanism 68, a second planetary gear mechanism 69, a Hi/Lo switching mechanism 70, and an output gear 71. The intermediate shaft 67 is linked with the FR switching mechanism 65. The first planetary gear mechanism 68 and the second planetary gear mechanism 69 are arranged on the same shaft as the intermediate shaft 67.

The first planetary gear mechanism 68 has a first sun gear S1, a plurality of first planetary gears P1, a first carrier C1 which supports the plurality of first planetary gears P1, and a first ring gear member Rm1. The first sun gear S1 is linked with the intermediate shaft 67. The plurality of first planetary gears P1 engage with the first sun gear S1 and are supported by the first carrier C1 so as to be able to rotate. A first carrier gear Gc1 is provided on an outer circumference section of the first carrier C1. A first ring gear R1 is provided on the inner circumference of the first ring gear member Rm1. The first ring gear R1 engages with the plurality of planetary gears P1 and is able to rotate. In addition, a first ring outer circumference gear Gr1 is provided on the outer circumference of the first ring gear member Rm1.

The second planetary gear mechanism 69 has a second sun gear S2, a plurality of second planetary gears P2, a second carrier C2 which supports the plurality of second planetary gears P2, and a second ring gear member Rm2. The second sun gear S2 is linked with the first carrier C1. The plurality of second planetary gears P2 engage with the second sun gear S2 and are supported by the second carrier C2 to be able to rotate. A second ring gear R2 is provided on the inner circumference of the second ring gear member Rm2. The second ring gear R2 engages with the plurality of planetary gears P2 and is able to rotate. A second ring outer circumference gear Gr2 is provided on the outer circumference of the second ring gear member Rm2. The second ring outer circumference gear Gr2 engages with the output gear 71 and rotation from the second ring gear R2 is output to the output shaft 63 via the output gear 71.

The Hi/Lo switching mechanism 70 is a mechanism for switching a drive force transfer pathway in the transmission 24 between a high speed mode (Hi mode) where the vehicle speed is high and a low speed mode (Lo mode) where the vehicle speed is low. The Hi/Lo switching mechanism 70 has a second clutch CH which is on during the Hi mode and a first clutch CL which is on during the Lo mode. The second clutch CH connects or disconnects the first ring gear R1 and the second carrier C2. In addition, the first clutch CL connects or disconnects the second carrier C2 and a fixing end 72 and blocks or permits rotation of the second carrier C2.

Here, each of the clutches CH and CL are hydraulic clutches and hydraulic fluid from the transmission pump 29 is supplied respectively to each of the clutches CH and CL. Hydraulic fluid to each of the clutches CH and CL is controlled using the clutch control valve 32.

The first motor MG1, the second motor MG2, and the third motor MG3 function as drive motors which generate drive force using electrical energy. In addition, the first motor MG1, the second motor MG2, and the third motor MG3 also function as generators which generate electrical energy using drive force which is input.

A first motor gear Gm1 is fixed to a rotation shaft Sm1 in the first motor MG1. The first motor gear Gm1 engages with the first carrier gear Gc1. A second motor gear Gm2 is fixed to a rotation shaft Sm2 in the second motor MG2. The second motor gear Gm2 engages with the first ring outer circumference gear Gr1.

The third motor MG3 assists the first motor MG1 and the second motor MG2. The gearing mechanism 66 has a motor switching mechanism 73 and the motor switching mechanism 73 switches the target which the third motor MG3 assists selectively between the first motor MG1 and the second motor MG2.

In detail, the motor switching mechanism 73 has a first motor clutch Cm1, a second motor clutch Cm2, a first connecting gear Ga1, and a second connecting gear Ga2. A third motor gear Gm3 is connected with a rotation shaft Sm3 of the third motor MG3 and the third motor gear Gm3 engages with the first connecting gear Ga1. The first motor clutch Cm1 switches between connection and disconnection of the rotation shaft Sm1 of the first motor MG1 and the first connecting gear Ga1. The first connecting gear Ga1 engages with the second connecting gear Ga2. The second motor clutch Cm2 switches between connection and disconnection of the rotation shaft Sm2 of the second motor MG2 and the second connecting gear Ga2.

The first motor clutch Cm1 and the second motor clutch Cm2 are hydraulic clutches. Hydraulic fluid from the transmission pump 29 is supplied respectively to each of the motor clutches Cm1 and Cm2. Hydraulic fluid to each of the motor clutches Cm1 and Cm2 is controlled using the clutch control valve 32.

The third motor gear Gm3 assists the first motor MG1 in a state where the first motor clutch Cm1 is connected and the second motor clutch Cm2 is disconnected. The third motor gear Gm3 assists the second motor MG2 in a state where the second motor clutch Cm2 is connected and the first motor clutch Cm1 is disconnected.

The first motor MG1 is connected with a capacitor 64 via a first inverter I1. The second motor MG2 is connected to the capacitor 64 via a second inverter I2. The third motor MG3 is connected with the capacitor 64 via a third inverter I3.

The capacitor 64 functions as an energy retaining section which stores energy which is generated by the motors MG1, MG2, and MG3. That is, the capacitor 64 stores electrical power which is generated by each of the motors MG1, MG2, and MG3 when the total amount of electrical power generated by each of the motors MG1, MG2, and MG3 is large. In addition, the capacitor 64 discharges power when the total amount of electrical power consumed by each of the motors MG1, MG2, and MG3 is large. That is, each of the motors MG1, MG2, and MG3 are driven using electrical power which is stored in the capacitor 64. Here, a battery may be used as the electricity storage means instead of the capacitor.

The working vehicle 1 is provided with a control section 31. The control section 31 applies command signals, which express command torque to each of the motors MG1, MG2, and MG3, to the respective inverters I1, I2, and I3. In addition, the control section 31 applies command signals, which are for controlling the clutch hydraulics for each of the clutches CF, CR, CH, CL, Cm1, and Cm2, to the clutch control valve 32. The clutch control valve 32 includes a plurality of valves for controlling each of the clutches CF, CR, CH, CL, Cm1, and Cm2.

The gearing ratio and output torque of the transmission 24 is controlled by controlling the motors MG1, MG2, and MG3 and the clutches CF, CR, CH, CL, Cm1, and Cm2 using command signals from the control section 31. The operations of the transmission 24 will be described below.

Figures 3, 4:
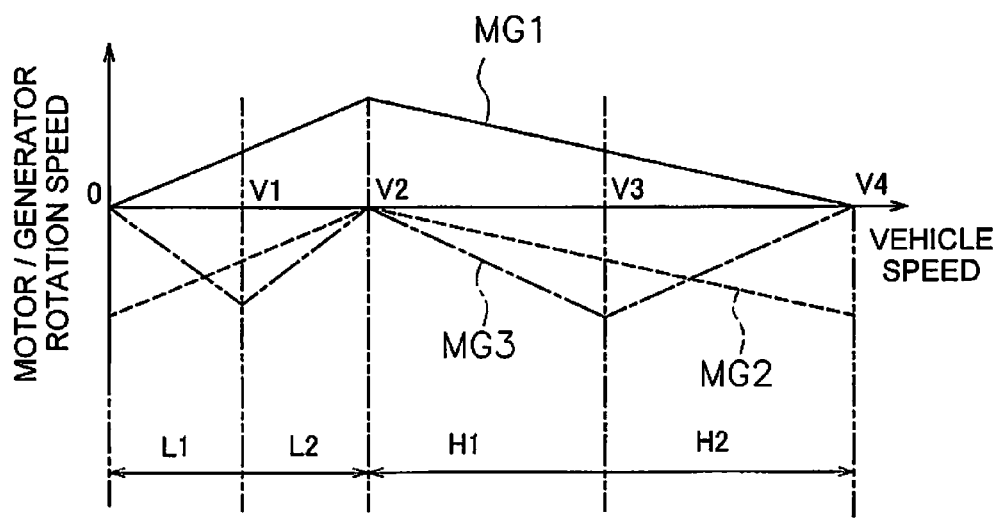
FIG. 3 is a table illustrating functions of first to third motors and the states of each clutch.
FIG. 4 is a diagram illustrating changes in rotation speeds of first to third motors with regard to vehicle speed.

Here, basic operations of the transmission 24 will be described using FIG. 3 and FIG. 4 in a case where the vehicle speed is accelerating forward from zero while the rotation speed of the engine 21 is maintained to be constant. FIG. 3 shows functions of the motors MG1, MG2, and MG3 and the states of the clutches in each mode. The Lo mode has an L1 mode and an L2 mode. The Hi mode has an H1 mode and an H2 mode. In FIG. 3, "M" has the meaning of the motors MG1, MG2, and MG3 functioning as a drive motor. "G" has the meaning of the motors MG1, MG2, and MG3 functioning as a generator. "O" has the meaning of the clutch being in a state of connection. "X" has the meaning of the clutch being in a state of disconnection.

FIG. 4 shows the rotation speeds of each of the motors MG1, MG2, and MG3 with regard to vehicle speed. In a case where the rotation speed of the engine 21 is constant, the vehicle speed changes according to the rotation speed ratio of the transmission 24. The rotation speed ratio is the ratio of the rotation speed of the output shaft 63 with regard to the rotation speed of the input shaft 61. Accordingly, changes in vehicle speed in FIG. 4 coincide with changes in the rotation speed ratio of the transmission 24. That is, FIG. 4 shows the relationship between the rotation speeds of each of the motors MG1, MG2, and MG3 and the rotation speed ratio of the transmission 24. In FIG. 4, the solid line indicates the rotation speed of the first motor MG1, the dashed line indicates the rotation speed of the second motor MG2, and the one-dot chain line indicates the rotation speed of the third motor MG3.

Over the range where the vehicle speed is equal to or more than zero and less than V1, the first clutch CL is connected, the second clutch CH is disconnected, the first motor clutch Cm1 is connected, and the second motor clutch Cm2 is disconnected (L1 mode). Since the second clutch CH is disconnected, the second carrier C2 and the first ring gear R1 are disconnected. Since the first clutch CL is connected, the second carrier C2 is fixed. In addition, the first connecting gear Ga1 is connected with the rotation shaft Sm1 of the first motor MG1 and the second connecting gear Ga2 is disconnected from the rotation shaft Sm2 of the second motor MG2. Due to this, the third motor MG3 is connected with the first motor MG1 via the third motor gear Gm3, the first connecting gear Ga1, and the first motor clutch Cm1. In addition, since the second motor clutch Cm2 is disconnected, the third motor MG3 is disconnected from the second motor MG2.

In the L1 mode, the drive force from the engine 21 is input into the first sun gear S1 via the intermediate shaft 67 and this drive force is output from the first carrier C1 to the second sun gear S2. On the other hand, the drive force which is input into the first sun gear S1 is transferred from the first planetary gears P1 to the first ring gear R1 and is output to the second motor MG2 via the first ring outer circumference gear Gr1 and the second motor gear Gm2. In the L1 mode, the second motor MG2 mainly functions as a generator and a portion of the electrical power which is generated by the second motor MG2 is stored in the capacitor 64.

In addition, the first motor MG1 and the third motor MG3 mainly function as electric motors in the L1 mode. The drive force from the first motor MG1 and the third motor MG3 is output to the second sun gear S2 using a pathway of the first motor gear Gm1→the first carrier gear Gc1→the first carrier C1. The drive force which is output to the second sun gear S2 in the manner described above is transferred to the output shaft 63 using a pathway of the second planetary gears P2→the second ring gear R2→the second ring outer circumference gear Gr2→the output gear 71.

Over the range where the vehicle speed is equal to or more than V1 and less than V2, the first clutch CL is connected, the second clutch CH is disconnected, the first motor clutch Cm1 is disconnected, and the second motor clutch Cm2 is connected (L2 mode). Accordingly, the second connecting gear Ga2 is connected with the rotation shaft Sm2 of the second motor MG2 and the first connecting gear Ga1 is disconnected from the rotation shaft Sm1 of the first motor MG1. Due to this, the third motor MG3 is connected with the second motor MG2 via the third motor gear Gm3, the first connecting gear Ga1, the second connecting gear Ga2, and the second motor clutch Cm2. In addition, since the first motor clutch Cm1 is disconnected, the third motor MG3 is disconnected from the first motor MG1.

In the L2 mode, the drive force from the engine 21 is input into the first sun gear S1 via the intermediate shaft 67 and this drive force is output from the first carrier C1 to the second sun gear S2. On the other hand, the drive force which is input into the first sun gear S1 is transferred from the first planetary gears P1 to the first ring gear R1 and is output to the second motor MG2 via the first ring outer circumference gear Gr1 and the second motor gear Gm2. In addition, drive force is output from the second motor MG2 to the third motor MG3 via the second motor clutch Cm2, the second connecting gear Ga2, the first connecting gear Ga1, and the third motor gear Gm3. In the L2 mode, the second motor MG2 and the third motor MG3 mainly function as generators and a portion of the electrical power which is generated by the second motor MG2 and the third motor MG3 is stored in the capacitor 64.

In addition, the first motor MG1 mainly functions as an electric motor in the L2 mode. The drive force from the first motor MG1 is output to the second sun gear S2 using a pathway of the first motor gear Gm1→the first carrier gear Gc1→the first carrier C1. The drive force which is output to the second sun gear S2 in the manner described above is transferred to the output shaft 63 using a pathway of the second planetary gears P2→the second ring gear R2→the second ring outer circumference gear Gr2→the output gear 71.

Over the range where the vehicle speed is equal to or more than V2 and less than V3, the first clutch CL is disconnected, the second clutch CH is connected, the first motor clutch Cm1 is disconnected, and the second motor clutch Cm2 is connected (H1 mode). Since the second clutch CH is connected in the H1 mode, the second carrier C2 and the first ring gear R1 are connected. In addition, since the first clutch CL is disconnected, the second carrier C2 is released. Accordingly, the rotation speeds of the first ring gear R1 and the second carrier C2 coincide. In addition, the second connecting gear Ga2 is connected with the rotation shaft Sm2 of the second motor MG2 and the first connecting gear Ga1 is disconnected from the rotation shaft Sm1 of the first motor MG1. Due to this, the third motor MG3 is connected with the second motor MG2 via the third motor gear Gm3, the first connecting gear Ga1, the second connecting gear Ga2, and the second motor clutch Cm2. In addition, since the first motor clutch Cm1 is disconnected, the third motor MG3 is disconnected from the first motor MG1.

In the H1 mode, the drive force from the engine 21 is input into the first sun gear S1 and this drive force is output from the first carrier C1 to the second sun gear S2. In addition, the drive force which is input into the first sun gear S1 is output from the first carrier C1 to the first motor MG1 via the first carrier gear Gc1 and the first motor gear Gm1.

In the H1 mode, since the first motor MG1 mainly functions as a generator, a portion of the electrical power which is generated by the first motor MG1 is stored in the capacitor 64.

In addition, the second motor MG2 and the third motor MG3 mainly function as electric motors in the H1 mode. The drive force from the third motor MG3 is transferred from the third motor gear Gm3 to the rotation shaft Sm2 of the second motor MG2 via the first connecting gear Ga1, the second connecting gear Ga2, and the second motor clutch Cm2. Then, the drive force from the second motor MG2 and the drive force from the third motor MG3 is output to the second carrier C2 using a pathway of the second motor gear Gm2→the first ring outer circumference gear Gr1→the first ring gear R1→the second clutch CH. The drive force which is output to the second sun gear S2 in the manner described above is output to the second ring gear R2 via the second planetary gears P2 and the drive force which is output to the second carrier C2 is output to the second ring gear R2 via the second planetary gears P2. The drive force which is combined using the second ring gear R2 in this manner is transferred to the output shaft 63 via the second ring outer circumference gear Gr2 and the output gear 71.

Over the range where the vehicle speed is equal to or more than V3 and less than V4, the first clutch CL is disconnected, the second clutch CH is connected, the first motor clutch Cm1 is connected, and the second motor clutch Cm2 is disconnected (H2 mode). In the H2 mode, the first connecting gear Ga1 is connected with the rotation shaft Sm1 of the first motor MG1 and the second connecting gear Ga2 is disconnected from the rotation shaft Sm2 of the second motor MG2. Due to this, the third motor MG3 is connected with the first motor MG1 via the third motor gear Gm3, the first connecting gear Ga1, and the first motor clutch Cm1. In addition, since the second motor clutch Cm2 is disconnected, the third motor MG3 is disconnected from the second motor MG2.

In the H2 mode, the drive force from the engine 21 is input into the first sun gear S1 and this drive force is output from the first carrier C1 to the second sun gear S2. In addition, the drive force which is input into the first sun gear S1 is output from the first carrier C1 to the first motor MG1 and the third motor MG3 via the first carrier gear Gc1 and the first motor gear Gm1. In the H2 mode, since the first motor MG1 and the third motor MG3 mainly function as generators, a portion of the electrical power which is generated by the first motor MG1 and the third motor MG3 is stored in the capacitor 64.

In addition, the second motor MG2 mainly functions as an electric motor in the H2 mode. The drive force from the second motor MG2 is output to the second carrier C2 using a pathway of the second motor gear Gm2→the first ring outer circumference gear Gr1→the first ring gear R1→the second clutch CH. The drive force which is output to the second sun gear S2 in the manner described above is output to the second ring gear R2 via the second planetary gears P2 and the drive force which is output to the second carrier C2 is output to the second ring gear R2 via the second planetary gears P2. The drive force which is combined using the second ring gear R2 in this manner is transferred to the output shaft 63 via the second ring outer circumference gear Gr2 and the output gear 71.

Here, the above is a description of when driving forward but the operations are the same when driving in reverse.

Figure 5:
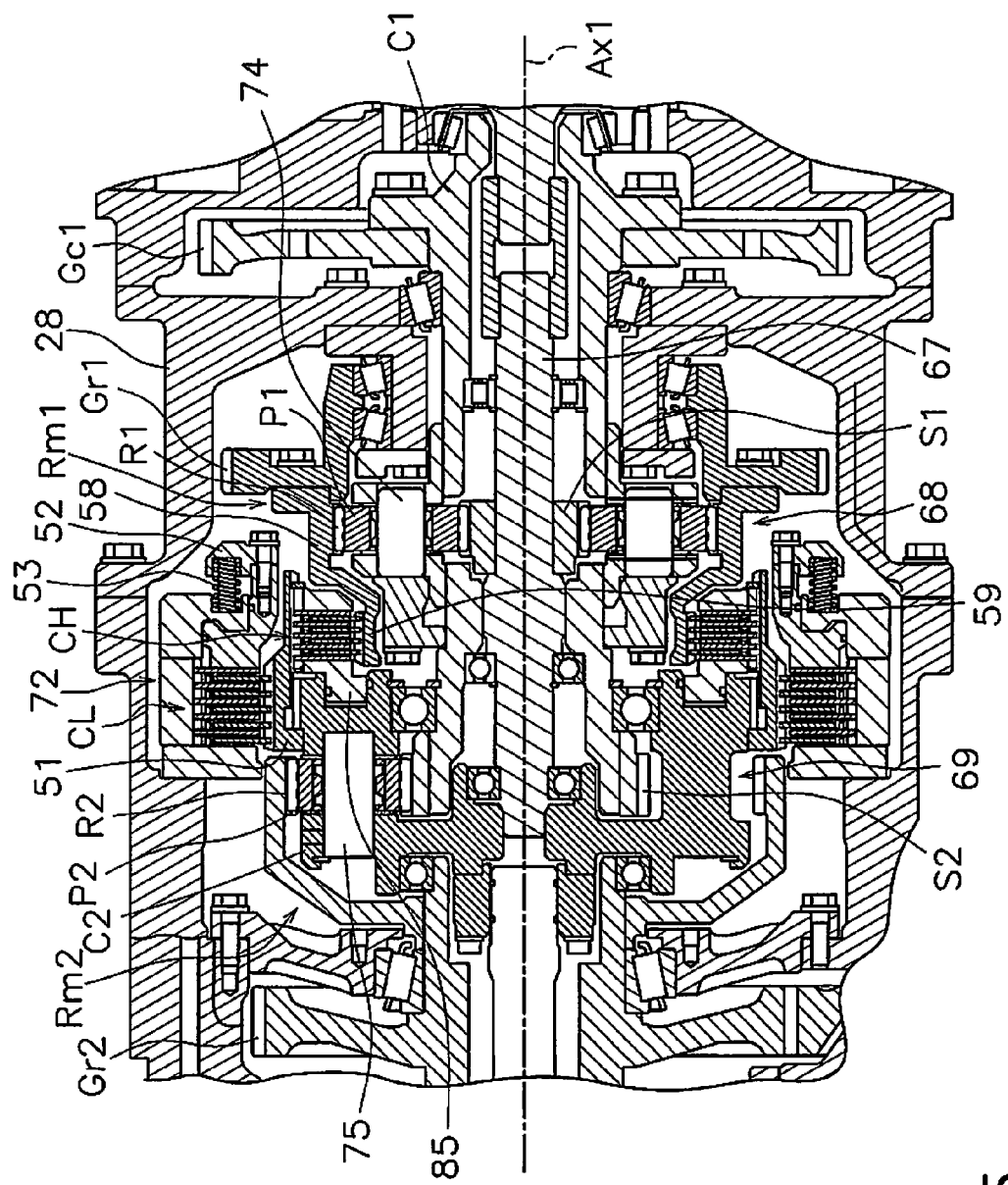
FIG. 5 is a cross sectional diagram of a portion of a transmission.

Next, the structure of the transmission 24 will be described. FIG. 5 is a diagram illustrating a portion of a cross section of the transmission 24. The transmission 24 has a housing 28 as shown in FIG. 5. The housing 28 accommodates the first planetary gear mechanism 68 and the second planetary gear mechanism 69. The second planetary gear mechanism 69 is arranged concentrically with the first planetary gear mechanism 68. The second planetary gear mechanism 69 is arranged to be separated from the first planetary gear mechanism 68 in the axial direction of the first planetary gear mechanism 68 (refer to one-dot chain line Ax1).

The first sun gear S1 is linked with the intermediate shaft 67. The first planetary gears P1 is arranged on the outside of the first sun gear S1 in the radial direction. The first carrier C1 supports the first planetary gears P1 via a first support pin 74 so as to be able to rotate. The first ring gear member Rm1 is positioned on the outside of the first carrier C1 and the first planetary gears P1 in the radial direction. The first ring gear R1 is arranged on the outside of the first planetary gears P1 in the radial direction.

The second sun gear S2 is linked with the first carrier C1. The second planetary gears P2 is arranged on the outside of the second sun gear S2 in the radial direction. The second planetary gears P2 is supported by the second carrier C2 via a second support pin 75 so as to be able to rotate. The second ring gear member Rm2 is positioned on the outside of the second carrier C2 and the second planetary gears P2 in the radial direction. The second ring gear R2 is arranged on the outside of the second planetary gears P2 and the second carrier C2 in the radial direction.

Here, on the outside in the radial direction in the present exemplary embodiment has the meaning of a direction of separating from an axis Ax1 of the first planetary gear mechanism 68 and the second planetary gear mechanism 69 in the radial direction. In addition, on the inside in the radial direction in the present exemplary embodiment has the meaning of a direction of moving closer to the axis Ax1 of the first planetary gear mechanism 68 and the second planetary gear mechanism 69 in the radial direction.

The first clutch CL and the second clutch CH are arranged between the first planetary gear mechanism 68 and the second planetary gear mechanism 69 in the axial direction. The first clutch CL is arranged between the second clutch CH and the second planetary gear mechanism 69 in the axial direction. In detail, the first clutch CL is arranged between the second clutch CH and the second planetary gears P2 in the axial direction. The second clutch CH is arranged between the first clutch CL and the first planetary gear mechanism 68 in the axial direction. In detail, the second clutch CH is arranged between the first clutch CL and the first planetary gears P1 in the axial direction. The second clutch CH has an outer diameter which is smaller than the outer diameter of the first clutch CL. The first clutch CL is arranged on the outside of the second carrier C2 in the radial direction. The second clutch CH is arranged on the outside of the first ring gear member Rm1 in the radial direction.

Figure 6:
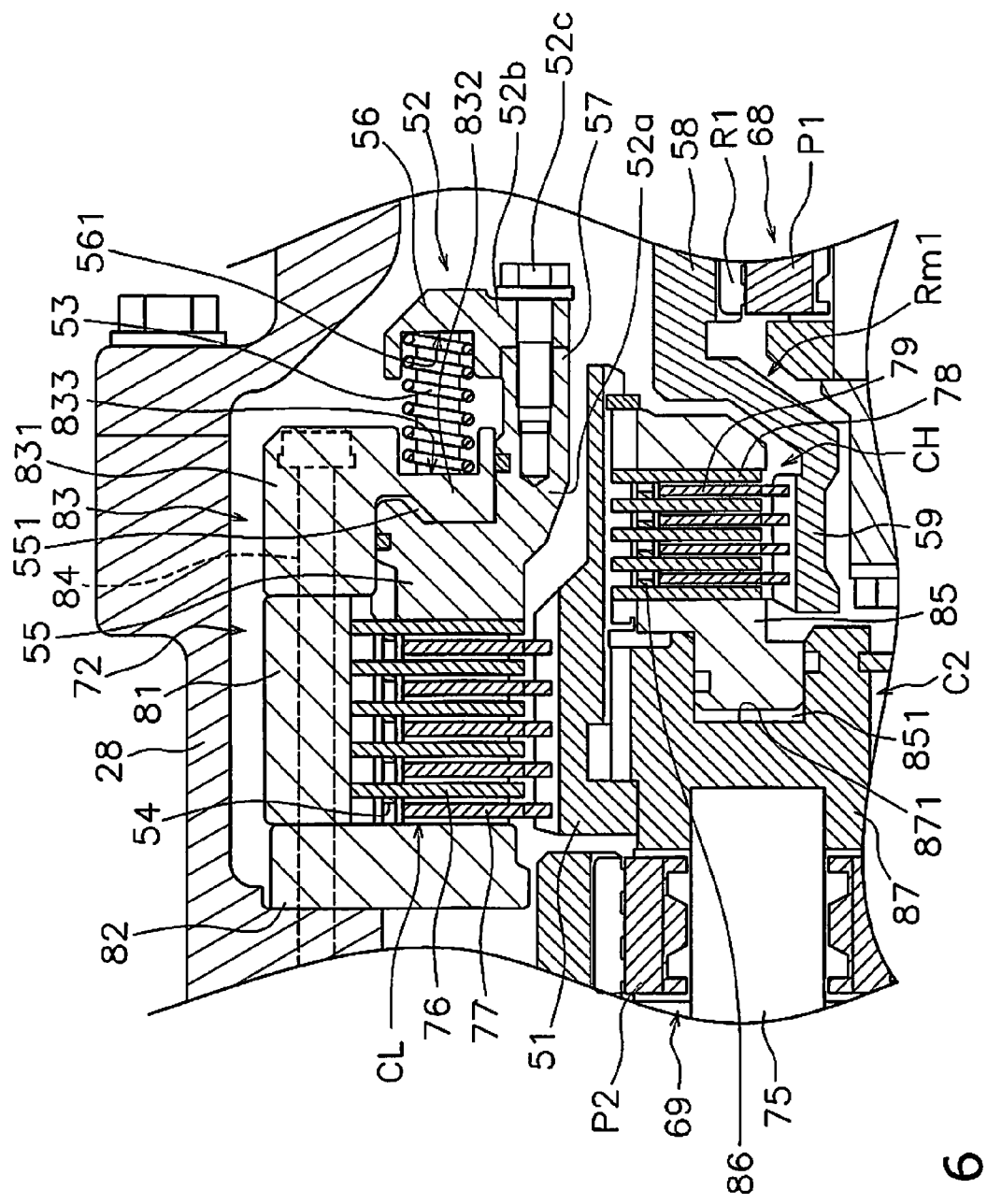
FIG. 6 is an enlarged diagram of a cross section of a portion of a transmission.

FIG. 6 is an enlarged diagram of a portion of a cross section of a portion of the transmission 24 in FIG. 5. The first clutch CL has a plurality of first clutch plates 76 and a plurality of second of second clutch plates 77 as shown in FIG. 6. Here, in the diagrams, the reference numeral 76 is only given to one of the first clutch plates 76, the reference numeral 77 is only given to one of the second clutch plates 77, and the reference numerals for the other clutch plates are omitted. The plurality of first clutch plates 76 and the plurality of the second clutch plates 77 are arranged to line up alternately in the axial direction. The first clutch plates 76 are attached to the fixing end 72. The first clutch plates 76 are fixed to the fixing end 72 so that rotation is not possible.

In addition, the first clutch plates 76 are attached to the fixing end 72 so as to be able to move in the axial direction.

The plurality of second clutch plates 77 are attached so as to be able to move in the axial direction with regard to the second carrier C2. The plurality of second clutch plates 77 are provided so as to rotate along with the second carrier C2. In detail, the second carrier C2 has a cylinder section 51. The plurality of second clutch plates 77 are attached to the outer circumference of the cylinder section 51.

The transmission 24 has a first piston 52, a return spring 53, and a first spring member 54. The first piston 52 is configured so that the first clutch CL is connected by applying pressure to the first clutch plates 76 and the second clutch plates 77. The first piston 52 lines up with the first clutch CL in the axial direction and is arranged on the outside of the second clutch CH in the radial direction. A portion of the first piston 52 is arranged on the outside of the first planetary gear mechanism 68 in the radial direction. In detail, a portion of the first piston 52 is arranged on the outside of the first planetary gears P1 of the first planetary gear mechanism 68 in the radial direction.

The return spring 53 lines up with the first clutch CL in the axial direction and is arranged on the outside of the second clutch CH in the radial direction. The return spring 53 presses so that the first piston 52 separates from the first clutch CL. The return spring 53 is a coil spring. The first spring member 54 is a wave spring which is arranged between the plurality of first clutch plates 76. The first spring member 54 presses the first clutch plates 76 so that the plurality of first clutch plates 76 separate from the plurality of second clutch plates 77.

The fixing end 72 is provided with a first clutch support section 81, a first clutch pressing section 82, a return spring support section 83, and a fixing member 84. The first clutch support section 81, the first clutch pressing section 82, and the return spring support section 83 are each separate bodies.

The first clutch support section 81 is arranged on the outside of the first clutch CL in the radial direction. The plurality of first clutch plates 76 are attached to the first clutch support section 81. The first clutch pressing section 82 is arranged to line up with the first clutch CL in the axial direction. The first clutch CL is positioned between the first clutch pressing section 82 and the first piston 52 in the axial direction. The return spring support section 83 supports the return spring 53. The fixing member 84 fixes the return spring support section 83, the first clutch support section 81, and the first clutch pressing section 82 to the housing 28 to overlap in the axial direction. Due to this, the return spring support section 83 is fixed to the housing 28. The fixing member 84 is, for example, a bolt.

The first piston 52 has a first flange section 55, a second flange section 56, and a linking section 57. The second flange section 56 is arranged to be separated from the first flange section 55 in the axial direction. The linking section 57 links the first flange section 55 and the second flange section 56. The first flange section 55 protrudes from the linking section 57 toward the outside in the radial direction. The second flange section 56 protrudes from the linking section 57 toward the outside in the radial direction.

The first flange section 55 is positioned between the first clutch CL and the return spring support section 83. The return spring 53 is arranged between the return spring support section 83 and the second flange section 56. In detail, the return spring support section 83 has a piston support section 831 and an inner flange section 832. The piston support section 831 is positioned on the outside of the first piston 52 in the radial direction. The first piston 52 is provided to be able to move in the axial direction along the inner circumference of the piston support section 831.

The inner flange section 832 protrudes from the piston support section 831 toward the inside in the radial direction. The inner flange section 832 is positioned between the first flange section 55 and the second flange section 56. A concave section 833 is provided on one side surface of the inner flange section 832. A concave section 561 is provided on a side surface of the second flange section 56. One end of the return spring 53 is arranged in the concave section 833 of the inner flange section 832 and the other end of the return spring 53 is arranged in the concave section 561 of the second flange section 56. Due to this, the return spring 53 is arranged to span between the first piston 52 and the return spring support section 83.

A hydraulic fluid chamber 551 is formed between the other side surface of the inner flange section 832 and the first flange section 55. The first piston 52 moves in a direction to be closer to the first clutch CL against the force of the return spring 53 due to hydraulic fluid being filled into the hydraulic fluid chamber 551. Due to this, the first clutch CL is connected by the first piston 52 applying pressure for the first clutch plates 76 toward the second clutch plates 77. In addition, when there is relief of hydraulic fluid in the hydraulic fluid chamber 551, the first piston 52 moves in a direction to separate from the first clutch CL due to the force of the return spring 53. At this time, the hydraulic fluid in the hydraulic fluid chamber 551 is discharged from the hydraulic fluid chamber 551 due to being pressed by the first piston 52. Due to this, the first clutch CL is disconnected due to separating of the first clutch plates 76 and the second clutch plates 77.

Here, the first piston 52 has a first component 52a, a second component 52b which is a separate body to the first component 52a, and a fastening member 52c. The first component 52a includes the first flange section 55 and the linking section 57. The second component 52b includes the second flange section 56. The fastening member 52c is, for example, a bolt and fixes the second component 52b to the first component 52a. The fastening member 52c fixes the second component 52b to the first component 52a by being inserted in the second component 52b and the first component 52a in the expansion and contraction direction of the return spring 53, that is, the axial direction.

The second clutch CH has a plurality of third clutch plates 78 and a plurality of fourth clutch plates 79. Here, in the diagrams, the reference numeral 78 is only given to one of the third clutch plates 78, the reference numeral 79 is only given to one of the fourth clutch plates 79, and the reference numerals for the other clutch plates are omitted. The plurality of third clutch plates 78 and the plurality of the fourth clutch plates 79 are arranged to line up alternately in the axial direction. The plurality of third clutch plates 78 are attached to the second carrier C2. The plurality of third clutch plates 78 are attached to the second carrier C2 so that rotation with regard to the second carrier C2 is not possible. The plurality of third clutch plates 78 rotate along with the second carrier C2. The plurality of third clutch plates 78 are attached to the second carrier C2 so as to be able to move in the axial direction. In detail, the plurality of third clutch plates 78 are attached to the inner circumference of the cylinder section 51 of the second carrier C2.

The plurality of fourth clutch plates 79 are attached so that rotation with regard to the first ring gear member Rm1 is not possible. The plurality of fourth clutch plates 79 are provided so as to rotate along with the first ring gear member Rm1. The plurality of fourth clutch plates 79 are attached to the first ring gear member Rm1 so as to be able to move in the axial direction. In detail, the first ring gear member Rm1 has a first cylinder section 58 and a second cylinder section 59. The first ring gear R1 described above is provided on the inner circumference of the first cylinder section 58. The outer diameter of the second cylinder section 59 is smaller than the outer diameter of the first cylinder section 58. The second cylinder section 59 is arranged on the inside of the cylinder section 51 of the second carrier C2 in the radial direction. The plurality of fourth clutch plates 79 are arranged on the outer circumference of the second cylinder section 59.

Here, the outer diameter of the first ring outer circumference gear Gr1 described above is larger than the outer diameter of the first cylinder section 58 as shown in FIG. 5. The outer diameter of the first ring outer circumference gear Gr1 is larger than the outer diameter of the cylinder section 51 of the second carrier C2. The first piston 52 is positioned on the outside of the first cylinder section 58 in the radial direction. The first piston 52 lines up with the first ring outer circumference gear Gr1 in the axial direction.

The transmission 24 has a second piston 85 and a second spring member 86 as shown in FIG. 6. The second piston 85 is configured so that the second clutch CH is connected by applying pressure to the plurality of third clutch plates 78 and the plurality of fourth clutch plates 79. The second piston 85 is arranged to line up with the second clutch CH in the axial direction. The second piston 85 is arranged on the inside of the first clutch CL in the radial direction.

The second spring member 86 is a wave spring which is positioned between the plurality of third clutch plates 78. The second spring member 86 presses the third clutch plates 78 so that the plurality of third clutch plates 78 separate from the plurality of fourth clutch plates 79.

The second piston 85 is arranged inside the cylinder section 51 of the second carrier C2. The second piston 85 is provided so as to be able to move in the axial direction along the inner circumference of the cylinder section 51 of the second carrier C2. A circular plate section 87 is arranged inside the cylinder section 51 of the second carrier C2. A concave section 871 is provided on a side surface of the circular plate section 87 and an end section of the second piston 85 is arranged in the concave section 871.

A hydraulic fluid chamber 851 is formed between the concave section 871 in the circular plate section 87 and the end section of the second piston 85. The second piston 85 moves in a direction to be closer to the second clutch CH against the force of the second spring member 86 due to hydraulic fluid being filled into the hydraulic fluid chamber 851. Due to this, the second clutch CH is connected by the second piston 85 applying pressure to the third clutch plates 78 toward the fourth clutch plates 79. In addition, when there is relief of hydraulic fluid in the hydraulic fluid chamber 851, the third clutch plates 78 move in a direction to separate from the fourth clutch plates 79 due to the force of the second spring member 86. Due to this, the second piston 85 moves in a direction to separate from the second clutch CH. At this time, the hydraulic fluid in the hydraulic fluid chamber 851 is discharged from the hydraulic fluid chamber 851 due to being pressed by the second piston 85. Due to this, the second clutch CH is disconnected. Here, in the second piston 85, the return spring 53 which applies pressure to the second piston 85 is not provided and the second piston 85 moves due to the force from the second spring member 86.

The working vehicle 1 according to the present exemplary embodiment has the following characteristics.

The return spring 53 is arranged in a space which lines up with the first clutch CL in the axial direction and is positioned on the outside of the second clutch CH in the radial direction by utilizing the difference in the outer diameter of the first clutch CL and the outer diameter of the second clutch CH. For this reason, even when the return spring 53 with a large force is used, it is possible to suppress increases in the size of the transmission 24 compared to a case where the return spring 53 is arranged on the outside of the first clutch CL in the radial direction or a case where the return spring 53 is arranged to line up with the first clutch CL and the second clutch CH in the axial direction. In addition, it is possible to secure a space for arranging the return spring 53 even when the first clutch CL and the second clutch CH are arranged in a compact manner between the first planetary gear mechanism 68 and the second planetary gear mechanism 69. For this reason, it is possible to suppress increases in the size of the transmission 24. Furthermore, it is possible to suppress the structure for connecting the first clutch CL and the housing 28 from becoming complicated.

The first piston 52 lines up with the first clutch CL in the axial direction and is arranged on the outside of the second clutch CH in the radial direction. For this reason, the first piston 52 is arranged in a space which lines up with the first clutch CL in the axial direction and is positioned on the outside of the second clutch CH in the radial direction by utilizing the difference in the outer diameter of the first clutch CL and the outer diameter of the second clutch CH. Due to this, it is possible to further suppress increases in the size of the transmission 24.

A portion of the first piston 52 is arranged on the outside of the first planetary gear mechanism 68 in the radial direction. That is, a portion of the first piston 52 is arranged by utilizing the space which is positioned on the outside of the first planetary gear mechanism 68 in the radial direction. Due to this, it is possible to further suppress increases in the size of the transmission 24.

The return spring 53 is a coil spring. Due to this, it is possible to secure the return spring 53 with a large force.

The second piston 85 is arranged on the inside of the first clutch CL in the radial direction. For this reason, the second piston 85 is arranged by utilizing the space on the inside of the first clutch CL, which has a large outer diameter, in the radial direction. Due to this, it is possible to further suppress increases in the size of the transmission 24.

The second spring member 86 is a wave spring which is arranged between the plurality of third clutch plates 78. For this reason, it is possible for the second spring member 86 to be arranged in a small space between the plurality of third clutch plates 78. Due to this, it is possible to further suppress increases in the size of the transmission 24. In addition, the force for moving the second piston 85 may be smaller since the second clutch CH is smaller compared to the first clutch CL. For this reason, it is difficult for the problem of there being a delay in the second clutch CH being disconnected to occur even when the return spring 53 for pressing the second piston 85 is not provided.

The first flange section 55 is arranged on the inside of the piston support section 831 of the return spring support section 83 in the radial direction. In addition, the inner flange section 832 of the return spring support section 83 is positioned between the first flange section 55 and the second flange section 56 in the first piston 52. For this reason, it is possible to suppress increases in the size of the transmission 24 compared to a case where the first clutch CL, the first piston 52, and the return spring support section 83 are arranged to simply line up in order in the axial direction.

The return spring support section 83, the first clutch support section 81, and the first clutch pressing section 82 are fixed to the housing 28 using the fixing member 84 in a state of overlapping with each other in the axial direction. For this reason, assembly is easy.

The first component 52a which includes the first flange section 55 and the second component 52b which includes the second flange section 56 are separate bodies. For this reason, it is possible to fix the second component 52b to the first component 52a in a state where the return spring support section 83 and the return spring 53 are positioned between the first flange section 55 and the second flange section 56. Due to this, assembly is easy. In addition, even when the force of the return spring 53 is large it is possible to easily perform assembly by using a bolt as the fastening member 52c which fixes the second component 52b to the first component 52a.

The second clutch CH switches between connection and disconnection of the second carrier C2 and the first ring gear R1. Accordingly, the second clutch CH is not connected with the housing 28. For this reason, it is possible to suppress the structure of the transmission 24 from becoming complicated even when the return spring 53 is arranged on the outside of the second clutch CH in the radial direction.

One exemplary embodiment of the present invention is described above but the present invention is not limited to the exemplary embodiment described above and various modifications are possible within a scope which does not depart from the gist of the invention.

The working vehicle is not limited to a wheel loader and may be other types of vehicles, such as a motor grader or a hydraulic excavator.

The exemplary embodiments of the present invention are not limited to an electro-mechanical transmission (EMT) and may be applied to a different type of transmission, such as a hydro-mechanical transmission (HMT). For example, the first motor MG1 functions as a hydraulic motor and a hydraulic pump in an HMT. The second motor MG2 functions as a hydraulic motor and a hydraulic pump. In addition, the third motor MG3 functions as a hydraulic motor and a hydraulic pump. The first motor MG1, the second motor MG2, and the third motor MG3 are pumps or motors with variable capacities and the capacities are controlled using the control section 31. Alternatively, the exemplary embodiments of the present invention may be applied to a transmission which is not provided in a motor.

The configuration of the transmission 24 is not limited to the configuration in the exemplary embodiment described above. For example, the shape, linking, and arrangement of each element in the two planetary gear mechanisms 68 and 69 are not limited to the shape, linking, and arrangement in the exemplary embodiment described above. The number of the planetary gear mechanisms is not limited to two and may be three or more. The number of the motors is not limited to three, and may be two or less, or may be four or more. For example, the third motor MG3 may be omitted.

A spring which is different to a coil spring may be used as the return spring 53. A spring which is different to a wave spring may be used as the first spring member 54. A spring which is different to a wave spring may be used as the second spring member 86.

According to the exemplary embodiments of the present invention, it is possible to suppress delays in a clutch being disconnected, increases in the size of a transmission, and the structure becoming complicated.

The invention claimed is:

1. A transmission comprising:
a first planetary gear mechanism;
a second planetary gear mechanism including a second sun gear, a plurality of second planetary gears which engage with the second sun gear, and a second carrier which supports the plurality of second planetary gears, the second planetary gear mechanism being arranged to be separated from the first planetary gear mechanism in an axial direction of the first planetary gear mechanism;
a housing accommodating the first planetary gear mechanism and the second planetary gear mechanism;
a first clutch configured to switch between connection and disconnection of the second carrier and the housing, the first clutch being arranged between the first planetary gear mechanism and the second planetary gear mechanism in the axial direction;
a second clutch arranged between the first planetary gear mechanism and the second planetary gear mechanism in the axial direction, the second clutch having an outer diameter which is smaller than an outer diameter of the first clutch;
a first piston configured to apply pressure to the first clutch to connect the first clutch, the first piston including
a first flange section,
a second flange section arranged to be separated from the first flange section in the axial direction, and
a linking section which links the first flange section and the second flange section;
a return spring lining up with the first clutch in the axial direction, the return spring being arranged on an outside of the second clutch in the radial direction, the return spring pressing the first piston to separate from the first clutch;
a return spring support section fixed to the housing,
the return spring support section being positioned between the first flange section and the second flange section,
the first flange section being positioned between the first clutch and the return spring support section, and
the return spring being arranged between the return spring support section and the second flange section;
a first clutch support section arranged on the outside of the first clutch in the radial direction, the first clutch support section supporting the first clutch;
a first clutch pressing section arranged to line up with the first clutch in the axial direction; and
a fixing member fixing the return spring support section, the first clutch support section, and the first clutch pressing section to the housing to overlap in the axial direction.

2. The transmission according to claim 1, wherein the first piston lines up with the first clutch in the axial direction and is arranged on the outside of the second clutch in the radial direction.

3. The transmission according to claim 2, wherein a portion of the first piston is arranged on an outside of the first planetary gear mechanism in the radial direction.

4. The transmission according to claim 3, wherein the return spring is a coil spring.

5. The transmission according to claim 4, further comprising
a second piston configured to apply pressure to the second clutch to connect the second clutch,
the second piston being arranged on an inside of the first clutch in the radial direction.

6. The transmission according to claim 5, further comprising
a spring member pressing the second clutch so that the second clutch is disconnected,
the second clutch having a plurality of clutch plates, and
the spring member being a wave spring which is arranged between the plurality of clutch plates.

7. The transmission according to claim 6, wherein
the first piston has
  a first component which includes the first flange section,
  a second component which is a separate body from the first component, the second component including the second flange section, and
  a fastening member fixing the second component to the first component.

8. The transmission according to claim 7, wherein
the first planetary gear mechanism has
  a first sun gear,
  a plurality of first planetary gears which engage the first sun gear, and
  a first ring gear which engages the plurality of planetary gears, the first ring gear being provided to be able to rotate, and
the second clutch switches between connection and disconnection of the second carrier and the first ring gear, the second clutch being arranged between the first clutch and the first planetary gear mechanism in the axial direction.

9. The transmission according to claim 1, wherein
a portion of the first piston is arranged on an outside of the first planetary gear mechanism in the radial direction.

10. The transmission according to claim 1, wherein
the return spring is a coil spring.

11. The transmission according to claim 1, further comprising
  a second piston configured to apply pressure to the second clutch to connect the second clutch,
  the second piston being arranged on an inside of the first clutch in the radial direction.

12. The transmission according to claim 1, further comprising
  a spring member pressing the second clutch so that the second clutch is disconnected,
  the second clutch having a plurality of clutch plates, and
  the spring member being a wave spring which is arranged between the plurality of clutch plates.

13. The transmission according to claim 1, wherein
the first planetary gear mechanism has
  a first sun gear,
  a plurality of first planetary gears which engage the first sun gear, and
  a first ring gear which engages the plurality of planetary gears, the first ring gear being provided to be able to rotate, and
the second clutch switches between connection and disconnection of the second carrier and the first ring gear.

14. The transmission according to claim 1, wherein
the second clutch is arranged between the first clutch and the first planetary gear mechanism in the axial direction.

15. A working vehicle comprising:
an engine;
a hydraulic pump driven by the engine;
a working implement driven by hydraulic fluid which is discharged from the hydraulic pump;
a travel apparatus driven by a drive force from the engine; and
the transmission according to claim 1 which transfers the drive force from the engine to the travel apparatus.

16. A transmission comprising:
a first planetary gear mechanism;
a second planetary gear mechanism including a second sun gear, a plurality of second planetary gears which engage with the second sun gear, and a second carrier which supports the plurality of second planetary gears, the second planetary gear mechanism being arranged to be separated from the first planetary gear mechanism in an axial direction of the first planetary gear mechanism;
a housing accommodating the first planetary gear mechanism and the second planetary gear mechanism;
a first clutch configured to switch between connection and disconnection of the second carrier and the housing, the first clutch being arranged between the first planetary gear mechanism and the second planetary gear mechanism in the axial direction;
a second clutch arranged between the first planetary gear mechanism and the second planetary gear mechanism in the axial direction, the second clutch having an outer diameter which is smaller than an outer diameter of the first clutch;
a first piston configured to apply pressure to the first clutch to connect the first clutch, the first piston including
  a first flange section,
  a second flange section arranged to be separated from the first flange section in the axial direction, and
  a linking section which links the first flange section and the second flange section;
a return spring lining up with the first clutch in the axial direction, the return spring being arranged on an outside of the second clutch in the radial direction, the return spring pressing the first piston to separate from the first clutch; and
a return spring support section fixed to the housing,
  the return spring support section being positioned between the first flange section and the second flange section,
  the first flange section being positioned between the first clutch and the return spring support section, and
  the return spring being arranged between the return wing support section and the second flange section,
the first piston having
  a first component which includes the first flange section,
  a second component which is a separate body from the first component, the second component including the second flange section, and
  a fastening member fixing the second component to the first component.

* * * * *